(12) United States Patent
Engelhardt et al.

(10) Patent No.: US 7,576,037 B2
(45) Date of Patent: Aug. 18, 2009

(54) PROCESS AND APPARATUS FOR COMBINATORIAL SYNTHESIS

(75) Inventors: Johnnie Paul Engelhardt, West Columbia, TX (US); David G. Gorenstein, Houston, TX (US); Bruce A. Luxon, Galveston, TX (US)

(73) Assignees: MEI Technologies, Inc., Houston, TX (US); Bd. of Regents, Univ. of Texas, Austin, TX (US)

( * ) Notice: Subject to any disclaimer, the term of this patent is extended or adjusted under 35 U.S.C. 154(b) by 0 days.

(21) Appl. No.: 11/282,800

(22) Filed: Nov. 18, 2005

(65) Prior Publication Data

US 2007/0117099 A1     May 24, 2007

(51) Int. Cl.
C40B 60/02 (2006.01)
C40B 60/08 (2006.01)
B01J 10/00 (2006.01)
B01J 12/02 (2006.01)

(52) U.S. Cl. .................. 506/34; 506/37; 422/129
(58) Field of Classification Search .......... 506/34, 506/37; 422/129
See application file for complete search history.

(56) References Cited

U.S. PATENT DOCUMENTS

| | | | |
|---|---|---|---|
| 4,363,786 A * | 12/1982 | Adams et al. ............ | 422/189 |
| 4,517,338 A | 5/1985 | Urdea et al. | |
| 4,671,941 A | 6/1987 | Niina et al. | |
| 5,143,854 A | 9/1992 | Pirrung et al. | |
| 5,182,366 A | 1/1993 | Huebner et al. | |
| 5,270,163 A | 12/1993 | Gold et al. | |
| 5,650,498 A | 7/1997 | Amo et al. | |
| 5,651,943 A | 7/1997 | Lam et al. | |
| 5,653,259 A | 8/1997 | Ramstad | |
| 5,840,841 A | 11/1998 | Zuckermann et al. | |
| 6,004,831 A | 12/1999 | Yamazaki et al. | |
| 6,056,926 A | 5/2000 | Sugarman et al. | |
| 6,180,348 B1 | 1/2001 | Li | |
| 6,290,915 B1 | 9/2001 | Palmer | |
| 6,420,123 B1 | 7/2002 | Furka | |
| 6,423,493 B1 | 7/2002 | Gorenstein et al. | |
| 6,716,583 B2 | 4/2004 | Gold et al. | |
| 2002/0048213 A1 * | 4/2002 | Wilmer et al. ............ | 366/136 |
| 2003/0027184 A1 | 2/2003 | Gorenstein | |

(Continued)

FOREIGN PATENT DOCUMENTS

WO    WO 92/00091    1/1992

(Continued)

OTHER PUBLICATIONS

Wiktionary, Fluid, retrieved on May 17, 2007 from: http://en.wiktionary.org/wiki/Fluid; on line search, p. 1 of 2.*

(Continued)

*Primary Examiner*—Sue Liu
(74) *Attorney, Agent, or Firm*—Wong Cabello Lutsch Rutherford & Brucculeri, LLP

(57) ABSTRACT

Apparatus and methods are described for split synthesis combinatorial chemistry that provides candidate libraries where an even distribution of theoretical products is obtainable through even mixing during the pooling step, followed by controlled redistribution of the mixed pooled products from the prior addition step into separate synthesis columns, one for each different specie of subunit to be added.

18 Claims, 12 Drawing Sheets

U.S. PATENT DOCUMENTS

| | | |
|---|---|---|
| 2003/0035756 A1* | 2/2003 | Nelson et al. ............... 422/68.1 |
| 2003/0100824 A1 | 5/2003 | Warren |
| 2005/0123939 A1 | 6/2005 | Gorenstein et al. |

FOREIGN PATENT DOCUMENTS

| | | |
|---|---|---|
| WO | WO 92/09300 | 6/1992 |
| WO | WO 93/09668 | 5/1993 |
| WO | WO 00/18503 | 4/2000 |
| WO | WO 03/05090 | 6/2003 |
| WO | WO 04/085049 | 10/2004 |
| WO | WO 05/003291 | 1/2005 |

OTHER PUBLICATIONS

"ABI 3900 High-Throughput DNA Synthesizer." Specification—Nucleic Acids Synthesis Products. Applied Biosystems: Foster City, CA. Oct. 2000. pp. 1-2.

"Applied Biosystems 3400 DNA Synthesizer." Product Bulletin—DNA Synthesis. Applied Biosystems: Foster City, CA. Apr. 2003. pp. 1-4.

Bock, Louis C., Linda C. Griffin, John A. Latham, Eric H. Vermaas and John J. Toole. "Selection of Single-Stranded DNA Molecules that Bind and Inhibit Human Thrombin." Nature. vol. 355. Feb. 6, 1992, pp. 564-566.

"Expedite 8900: Nucleic Acid Synthesis System—User's Guide." Applied Biosystems: Foster City, CA. Jun. 2001. pp. 1-314.

"Expedite 8900: Workstation Software—User's Guide." Applied Biosystems: Foster City, CA. Jun. 2001. pp. 1-280.

Fodor, Stephen P. A., J. Leighton Read, Michael C. Pirrung, Lubert Stryer, Amy Tsai Lu and Dennis Solas. "Light-Directed, Spatially Addressable Parallel Chemical Synthesis." Science. vol. 251, Feb. 15, 1991. pp. 767-773.

Furka, A., F. Sebestyen, M. Asgedom and G. Dibo. Asbract of "General Method for Rapid Synthesis of Multicomponent Peptide Mixtures." Protein Research. vol. 37. No. 6. Jun. 1991. pp. 487-493.

Gordon, Eric M., Ronald W. Barrett, William J. Dower, Stephen P. A. Fodor and Mark A. Gallop. "Applications of Combinatorial Technologies to Drug Discovery. 2. Combinatorial Organic Synthesis, Library Screening Strategies, and Future Directions." Journal of Medicinal Chemistry. vol. 37, No. 10. May 13, 1994. pp. 1385-1401.

Houghten, Richard A., Clemencia Pinilla, Sylvie E. Blondelle, Jon R, Appel, Colette T. Dooley and Julio H. Cuervo. "Generation and Use of Synthetic Peptide Combinatorial Libraries for Basic Research and Drug Discovery." Nature. vol. 354, Nov. 7, 1991. pp. 84-86.

Lam, Kit S., Syndney E. Salmon, Evan M. Hersh, Victor J. Hurby, Wieslaw M. Kazmierski and Richard J. Knapp. "A New Type of Synthetic Peptide Library for Identifying Ligand-Binding Activity." Nature. vol. 354. Nov. 7, 1991. pp. 82-84.

Mayer, Gunter, Mira Grattinger and Michael Blind. "Aptamers: Multifunctinal Tools for Target Validation and Drug Discovery." DrugPlus International. Nov.-Dec. 2003. pp. 1-4.

"Model 390Z: DNA/RNA Synthesizer & Interface Software—User's Manual." Applied Biosystems: Foster City, CA. May 2002. pp. 1-254.

Pon, Richard T. "Chemical Synthesis of Oligonucleotides." Course Lecture at University of Calgary. Oct. 2004. pp. 1-11.

Pon, Richard T. "Tips of Oligonucleotide Synthesis." http://www.abrf.org/ABRFNews/1994/December1994/dec94ponoligo.html. Jul. 27, 1995.

Sondek, John and David Shortle. "A general Strategy for Random Insertion and Substitution Mutagenesis: Substoichimetric Coupling of Trinucleotide Phosphormidites." Proceedings of the National Academy of Sciences of the USA. vol. 89, Apr. 1992. pp. 3581-3585.

Thompson, Lorin A. and Jonathan A. Ellman. "Synthesis and Applications of Small Molecule Libraries." Chemical Review. vol. 96. No. 1. 1996. pp. 555-600.

Virnekas, Bernhard, Liming Ge, Andreas Pluckthun, K. Christian Schneider, Gunter Wellnhofer and Simon E. Moroney. "Trinucleotide Phosphoramidites: Ideal Reagents for the Synthesis of Mixed Oligonucleotides for Random Mutagenesis." Nucleic Acids Research. vol. 22, No. 25, Nov. 1, 1994, pp. 5600-5607.

Yang, Xianbin, Suzanne E. Basset, Xin Li, Bruce A. Luxon, Norbert K. Herzog, Robert E. Shope, Judy Aronson, Tarl W. Prow, James F. Leary, Romy Kirby, Andrew D. Ellington and David G. Gorenstein. "Construction and Selection of Bead-Bound Combinatorial Oligonucleoside Phosphorothioate and Phosphorodithioate Aptamer Libraries Designed for Rapid PCR-Based Sequening," Nucleic Acids Research. vol. 30, No. 23 e132. 2002 . pp. 1-8.

Yang, Xianbin, Xin Li, Tarl W. Prow, Lisa M. Reece, Suzanne E. Basset, Bruce A. Luxon, Norbert K. Herzog, Judy Aronson, Robert E. Shope, James F. Leary and David G. Gorenstein. "Immunofluorescence Assay and Flow-Cytometry Selection of Bead-Bound Aptamers." Nucleic Acids Research. vol. 31. No. 10 e54. 2003. pp. 1-8.

Notification of Transmittal of the International Search Report and Written Opinion, International Search Report and Written Opinion of the International Searching Authority in corresponding PCT/US06/39440, mailed Aug. 13, 2007. 9 pages.

Yang, Xianbin and David G. Gorenstein, "Progress in Thioaptamer Development" Current Drug Targets, vol. 5, No. 8 (2004) pp. 705-715.

* cited by examiner

Top Schematic View

Side Schematic View

PROCESS AND APPARATUS FOR COMBINATORIAL SYNTHESIS

STATEMENT REGARDING GOVERNMENT INTERESTS

This work was supported in part by the following United States Government grants: AI27744 from the NIH and DAAD19011037 from the DoD (DARPA). The Government may have certain rights in this invention.

FIELD OF THE INVENTION

This invention relates generally to apparatus and methods for split synthesis of combinatorial oligomeric libraries.

BACKGROUND OF THE INVENTION

Without limiting the scope of the invention, its background is described in connection with existing apparatus and methods for use in combinatorial chemistry using split synthesis. Combinatorial chemistry refers to the production of libraries of diverse compounds that have the same constituent elements but are assembled in different sequence through the repetitive sequential covalent addition of the constituent subunits. Combinatorial chemistry is able to generate large populations of random sequence polymers, especially random sequence short chain polynucleotide and polypeptide polymers. Gordon, E. M., et al., *J. Med. Chem.* 37 (1994) 1385.

Combinatorial libraries are created by one of three general methods—parallel synthesis, one pot synthesis, or split synthesis. In parallel synthesis, different compounds are synthesized in separate vessels either on a solid support or in solution. A commonly used format for parallel synthesis in fixed arrays coupled with robotics instrumentation to add different reagents to separate wells of the array in a predefined manner to produce combinatorial libraries where the molecular structure of each product is defined by its location in the array. Fodor et al., *Science* 251 (1991) 767; U.S. Pat. No. 5,143,854; WO 93/09668. For example, the BioAutomation MERMADE instruments (Plano, Tex.) provide a 96 well format that can be used for parallel synthesis with tracking provided by XY table addressing of individual wells. When each individual member of the array is tested for activity, the composition of positive members of the array is known by review of the tracking and can be resynthesized. Parallel synthesis of this type yields relatively large quantities of a relatively small number of candidate compounds. Alternatively, libraries can be synthesized in arrays on microchips followed by simultaneous assay for binding or activity. Using photolithography, AFFYMAX (Palo Alto, Calif.) has generated arrays of more than 65,000 compounds on chips of about 1 square centimeter in area. Development of improved parallel synthesis methods and apparatus has been a primary focus of the combinatorial chemistry field. However, parallel synthesis remains limited by the number of individual molecules that can be generated depending on the size of the array.

In one pot synthesis, combinatorial libraries are made using mixtures of compounds added at each coupling step. However, in a coupling step, mixed reagents can compete to become integrated at the same site resulting in unequal distribution of components. Because the widely different coupling rates of different activated amino acids leads to unequal representation, split synthesis using solid particulate supports was developed for the generation of peptide libraries. Furka et al. *Int. J. Pept. Protein Res.* 37 (1991) 487; Lam, et al. *Nature* 354 (1991) 82 and WO92/00091, U.S. Pat. Nos. 5,650,489 and 5,651,943; Houghten et al., *Nature* 354 (1991) 84 and WO 92/09300; Hueber and Santi, U.S. Pat. No. 5,182,366. In addition, Lam et al. developed methods of screening one-bead one-compound (OBOC) libraries of peptides where each bead presents a single peptide species. Lam et al. supra.

In split synthesis, a plurality of base moieties are split into separate reaction vessels each for addition of a different further moiety. After addition, the groups are pooled and again split into the separate reaction vessels for addition of the next building block via a second round of derivatization and so on. Where particulate solid supports such as derivatized "beads" are used, the bound products of each cycle are retained on the solid phase while excess reagents and byproducts are washed away. By successive treatment with different reagents and/or addition of different chemical elements, the bound products are elongated on the solid support to form a large library of related compounds that are tested for desired properties. However, the loading capacity of beaded supports and the resulting low yield of each product for testing purposes has limited the applicability of split synthesis technologies and, consequently, pharmaceutical companies have preferred to use and further develop automated parallel synthesis methods for preparation of combinatorial libraries. See Lam et al. WO04/085049; Furka U.S. Pat. No. 6,420,123.

Candidate libraries of random sequence oligonucleotides can be generated manually or by modifying the normal operation of sequence specific nucleic acid synthesizers. However, commercial nucleic acid synthesizers are specifically designed to produce defined sequence oligonucleotides by the sequential programmed stepwise addition and coupling of single selected nucleotide bases. In order to generate random nucleic acid oligomers, commercially available nucleic acid synthesizers have been adapted to perform "mixed" synthesis. This essentially constitutes "one-pot" synthesis in which a mixture of nucleotide bases is added in lieu of a single defined base at each coupling step. Using mixed one-pot synthesis, each bead contains a number of different oligonucleotide species which are later cleaved from the support. This adaptation does not permit compensation for differing reaction rates and may result in skewing of the resultant population.

Split synthesis as originally adapted to generation of single bead peptide libraries has been recently applied to generate one-bead one-oligonucleotide libraries where each bead presents many copies of a single oligonucleotide sequence or species. However, available DNA synthesizers are not designed for split synthesis. Thus, the products from each round of synthesis must be manually pooled and split for subsequent rounds of synthesis, thus limiting the productivity of the synthesis.

From the foregoing it is apparent the there is a need in the art for apparatus and methods that are able to provide for the generation of representational libraries by split combinatorial synthesis, including the efficient automation of such processes.

BRIEF SUMMARY OF THE INVENTION

The present invention provides novel methods to, and apparatus for, split synthesis combinatorial chemistry that provides candidate libraries where an even distribution of theoretical products is obtainable through even mixing during the pooling step, followed by controlled redistribution of the mixed pooled products from the prior addition step into separate synthesis columns, one for each different specie of subunit to be added. In another embodiment, automated apparatus are provided for the efficient generation of representational libraries by split combinatorial synthesis.

In one embodiment of the invention, a reaction assembly is provided for synthesis of oligomers of random sequence subunits on fluidized solid supports comprising a plurality of synthesizer columns for containing the fluidized solid supports during an addition of a monomer subunit to the oligomer, a static mixer in fluid communication with each of the synthesizer columns via a plurality of conduits, and a mixing chamber in fluid communication with the static mixer.

In one embodiment of the invention, a reaction assembly is provided for synthesis of oligomers of random sequence subunits assembled on fluidized solid supports, the assembly including a plurality of synthesizer columns or chambers in fluid communication with a static mixer and a mixing chamber via a plurality of flow paths of approximately equal dimension. In one embodiment, the plurality of flow paths of approximately equal dimension is disposed in a splitter assembly that provides for an equal mixing fluid path between each synthesizer chamber and the static mixer.

In one embodiment, the mixing chamber is configured to resist trapping of the solid supports. In a further embodiment, the mixing chamber is devoid of recesses and interior angles of less than approximately 90°.

In one embodiment of the invention, the static mixer comprises a chamber intersected by fixed elements that create turbulence in a fluid conveying the solid supports through the chamber. The fixed elements can comprise one or more bars intersecting the conduit or can alternatively comprise one or more helical elements longitudinally fixed in the chamber.

In one embodiment of the invention, a synthesizer for combinatorial chemistry is provided comprising a plurality of synthesizer chambers or columns adapted to retain solid reaction supports within the columns during a series of reaction steps, each column comprising a reagent fluid path controlled by inlet and outlet reagent valves disposed on essentially opposing ends of each column, and a mixing fluid path controlled by first and second mixing valves disposed on essentially opposite ends of each column, wherein the mixing fluid path is able to transport a stream of fluidized solid supports into the synthesizer columns for the series of reaction steps as well as out of the synthesizer columns and into a common mixing chamber between reaction steps. In one embodiment the synthesizer includes a programmable interface for controlling a sequence of automated valve openings and closings that control whether the reagent fluid path or the mixing fluid path is active. Automated reagent and mixing valves can be provided for example by solenoid valves.

In one embodiment of the synthesizer a static mixer is disposed in fluid communication and in-line between the first mixing valve and the common mixing chamber. A motive force for the mixing fluid path can be provided by pressure controllable fluid reservoirs disposed at essentially opposite ends of the mixing fluid path. The mixing fluid path can be configured to provide an essentially equal fluid volume and pressure to and from each column and the common mixing chamber.

In one embodiment the synthesizer utilizes fluidized solid reaction supports that can be retained in each column during reaction steps by at least one fritted aperture. In one embodiment the synthesizer further comprises at least one splitter box disposed in the mixing fluid path between the columns and at least one of the pressure controllable fluid reservoirs. Splitter boxes can be disposed in the mixing fluid path between the columns and both of the pressure controllable fluid reservoirs. In one embodiment the mixing chamber is configured to resist trapping of the fluidized solid supports such as by the absence of recesses and interior angles of less than approximately 90°. The static mixer of the synthesizer can optionally comprise a conduit intersected by fixed elements that creates turbulence in a fluid conveying the solid supports through the conduit.

In one embodiment, a synthesizer for combinatorial chemistry is provided that includes a plurality of synthesizer chambers, each chamber having a valve controlled mixing outlet, a valve controlled fritted upper reagent inlet aperture, and a valve controlled fritted lower aperture, each fritted aperture able to pass a pressurized solution in and out of the chamber while retaining a fluidized solid support disposed in the chamber; and a static mixer disposed in fluid communication and in-line between the valve controlled mixing outlet and a mixing chamber, the mixing chamber having a fritted fluid connection to a pressure controllable reagent reservoir. In a further embodiment, a programmable interface for controlling a sequence of valve and pressurized solution movement is optionally provided.

In one embodiment, the fluid communication between the valve controlled mixing outlet of each synthesizer chamber and the static mixer is adapted or dimensioned to provide an essentially equal fluid volume and pressure between each chamber and the static mixer. In a further embodiment, the valve controlled fritted lower aperture is in fluid communication with a reagent reservoir and a further outlet valve. In one embodiment, the fluid communication between the valve controlled mixing outlet of each synthesizer chamber and the static mixer comprises a splitter box and the fluid communication between the valve controlled fritted lower aperture and the reagent reservoir is adapted or dimensioned to provide an essentially equal fluid path between each chamber and the reagent reservoir. Equal fluid paths are provided where the fluid path dimensions and pressure are adjusted to convey essentially the same volume through each fluid path, for example, by providing fluid conduits of essentially equal internal diameter and of essentially equal length.

One embodiment of the invention provides a method for generating random sequence oligomers, including the steps of establishing an individual synthesis chamber or column for each subunit species to be included in the oligomer and distributing a pool of activated or prederivitized fluidized solid supports in each synthesis chamber; conducting a random position addition reaction in each synthesis chamber to add a random position subunit to the activated or prederivitized fluidized solid supports and thereby create a different sequence reaction product in each synthesis chamber; mixing and pooling together the different sequence reaction products from each synthesis chamber by conveying the products in a stream from each synthesis chamber through a static mixer and into a mixing chamber; evenly redistributing the pooled products back into each synthesizer chamber; conducting a next addition reaction in each synthesis chamber to add a next subunit to the random sequence oligomer; and sequentially cycle through further mixing, pooling, redistributing and addition steps whereby a oligomer of a defined number of subunits is produced. In one embodiment of the method, the random sequence oligomer is an aptamer or a thioaptamer, and the prederivitized fluidized solid support comprises a defined PCR primer sequence.

In one embodiment, the defined PCR primer sequence is created in situ in at least one of the synthesizer columns following by conveyance through the static mixer and mixing chamber prior to being evenly distributed into each synthesizer chamber and prior to conducting the random position addition reactions. In one embodiment of the invention, one or more additions of subunits is conducted without a mixing and pooling step, thereby generating one or more regions of defined sequence in addition to one or more regions of random sequence.

In one embodiment, a library of random sequence oligomers is provided, wherein the library is characterized by representational populations of each theoretical product, the library generated according to a process comprising: establishing an individual synthesis chamber for each subunit species to be included in the random sequence oligomers and distributing a pool of activated or prederivitized fluidized solid supports in each synthesis chamber; conducting a random position addition reaction in each synthesis chamber to add a random position subunit to the activated or prederivitized fluidized solid supports to create a different sequence reaction product in each synthesis chamber; mixing and pooling the different sequence reaction products from each synthesis chamber by conveying the reaction products from each synthesis chamber through a static mixer and into a mixing chamber; redistributing, substantially evenly, the pooled reaction products back into each synthesizer chamber; conducting a next addition reaction in each synthesis chamber to add a next subunit to the random sequence oligomers; and repeating the acts of mixing and pooling, redistributing and conducting to produce a library of random sequence oligomers, each oligomer having a defined number of subunits. The library can be a nucleic acid, peptide, oligosaccharide, or small organic molecule library. In one embodiment the library is an aptamer or thioaptamer library.

BRIEF DESCRIPTION THE DRAWINGS

For a more complete understanding of the present invention, including features and advantages, reference is now made to the detailed description of the invention along with the accompanying figures.

Figure 3:
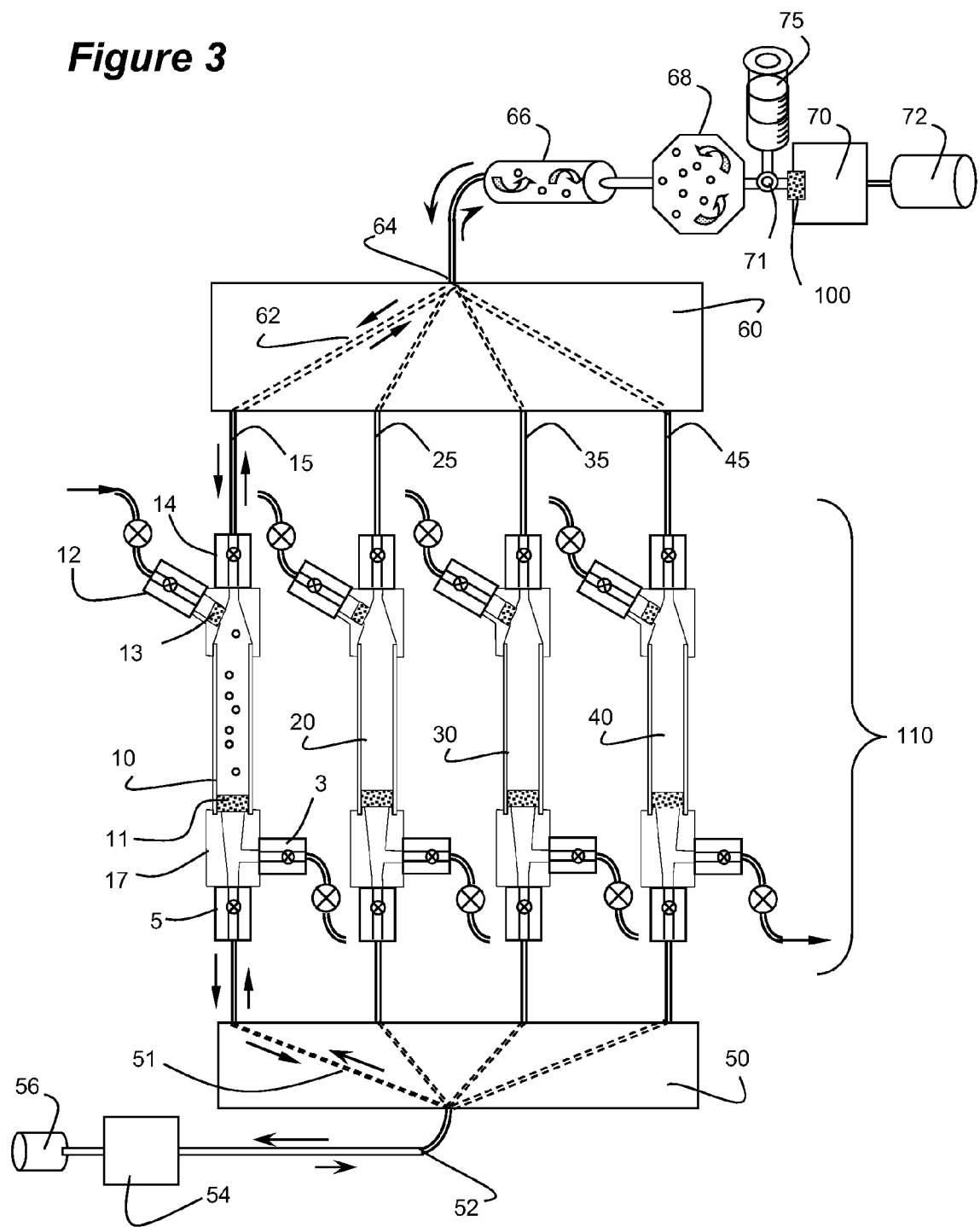

FIG. 3 presents a diagram of synthesizer according to one embodiment of the present invention.

Figure 4:
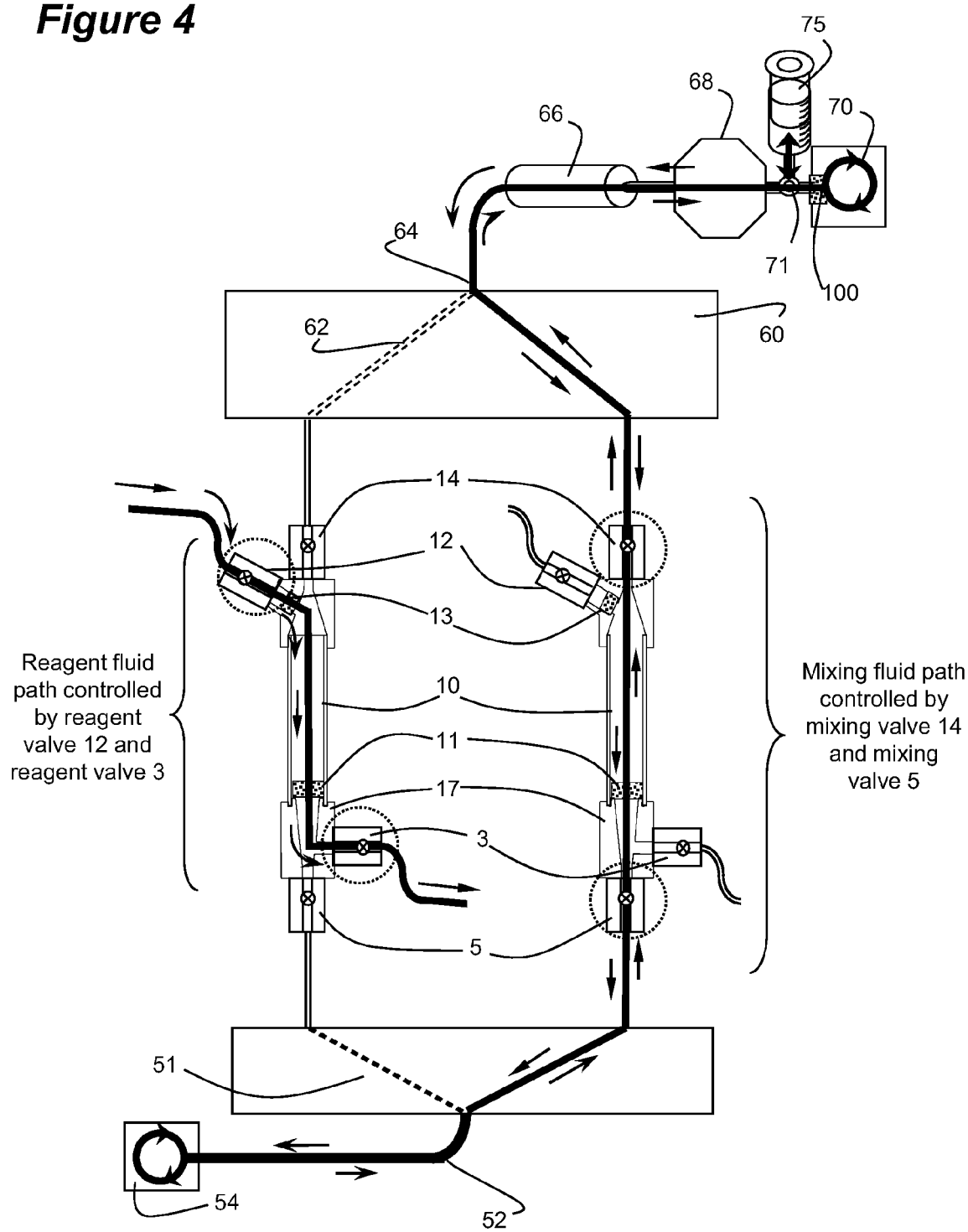

FIG. 4 presents fluid paths through the synthesizer according to one embodiment of the present invention.

Figure 5:
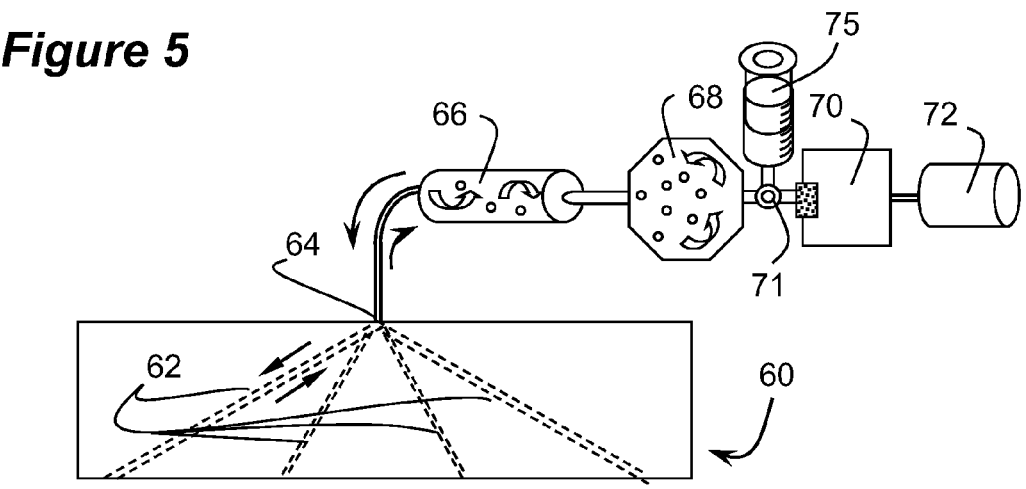

FIG. 5 illustrates a diagram of a portion of the synthesizer of FIG. 3 that provides efficient mixing and pooling.

Figure 6:
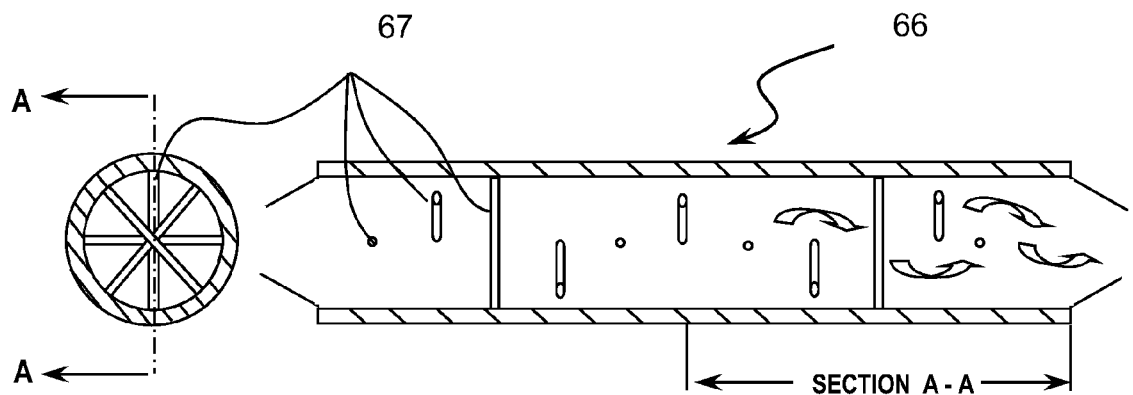

FIG. 6 is a graphic depiction of one type of static mixer that may be used to provide adequate mixing.

Figure 7:
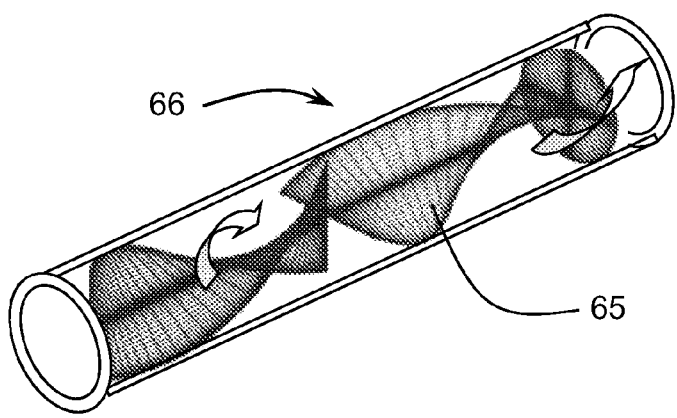

FIG. 7 is a graphic depiction of a helical type static mixer that may be used to provide adequate mixing.

Figure 8:
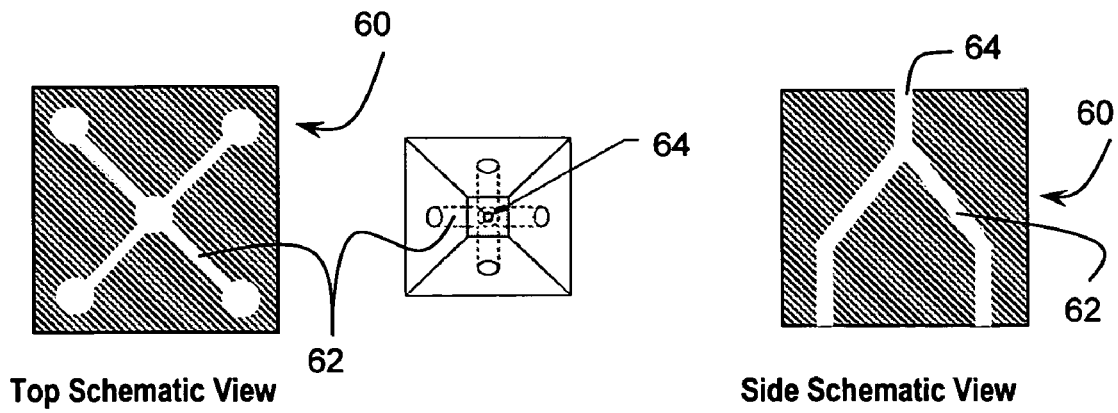

FIG. 8 depicts top and schematic views of a splitter in accordance with one embodiment.

Figure 9:
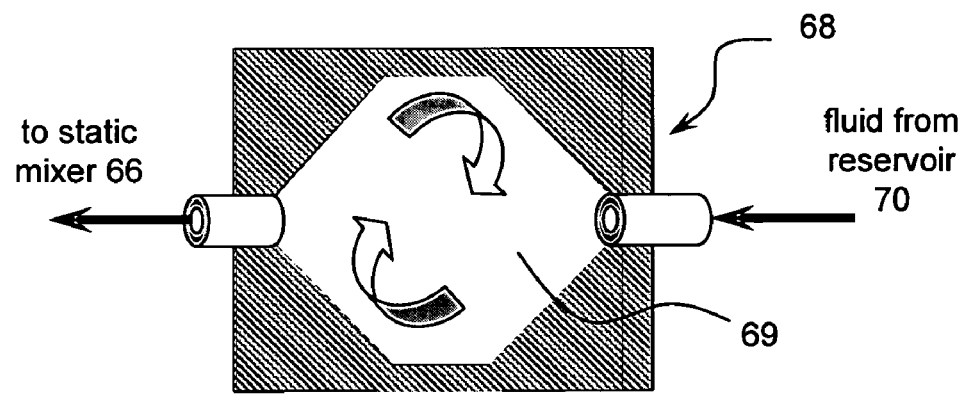

FIG. 9 is a graphic depiction of one embodiment of a mixing chamber that may be used to avoid trapping of solid phase supports.

Figure 10:
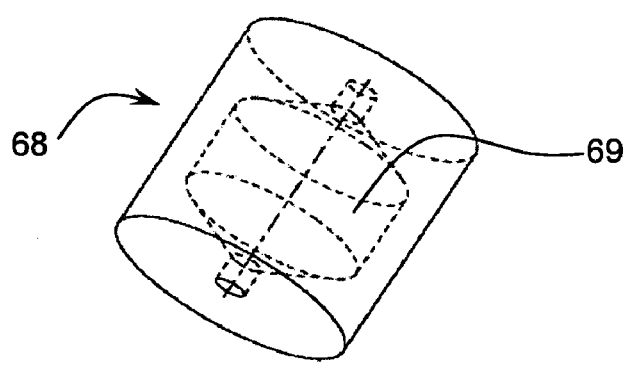

FIG. 10 is a three dimensional representation of one embodiment of a mixing chamber that may be used to avoid trapping of solid phase supports.

Figure 11:
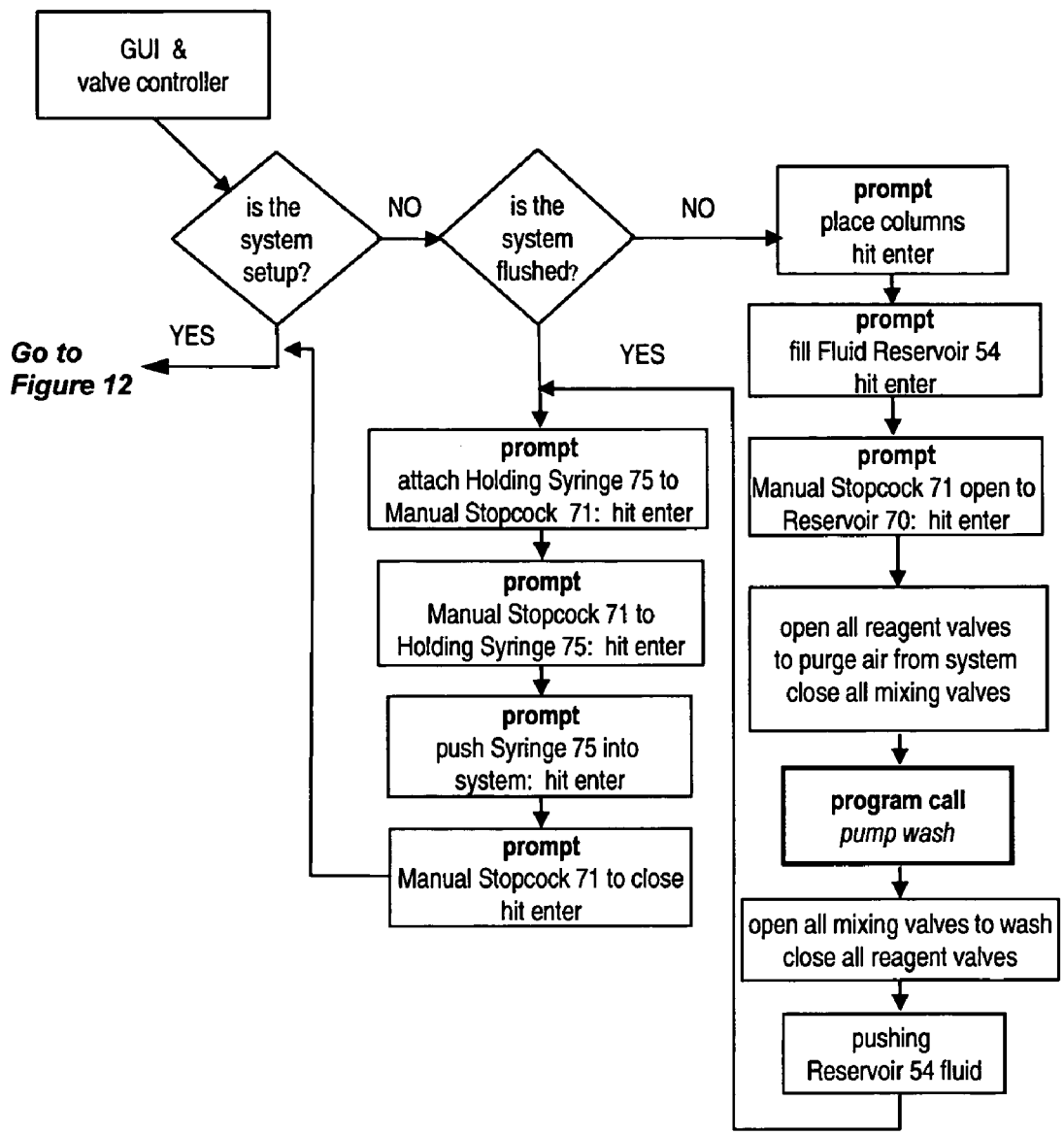

FIG. 11 is a process flow chart for set-up of an oligomer synthesizer according to one embodiment of the present invention.

Figure 12:
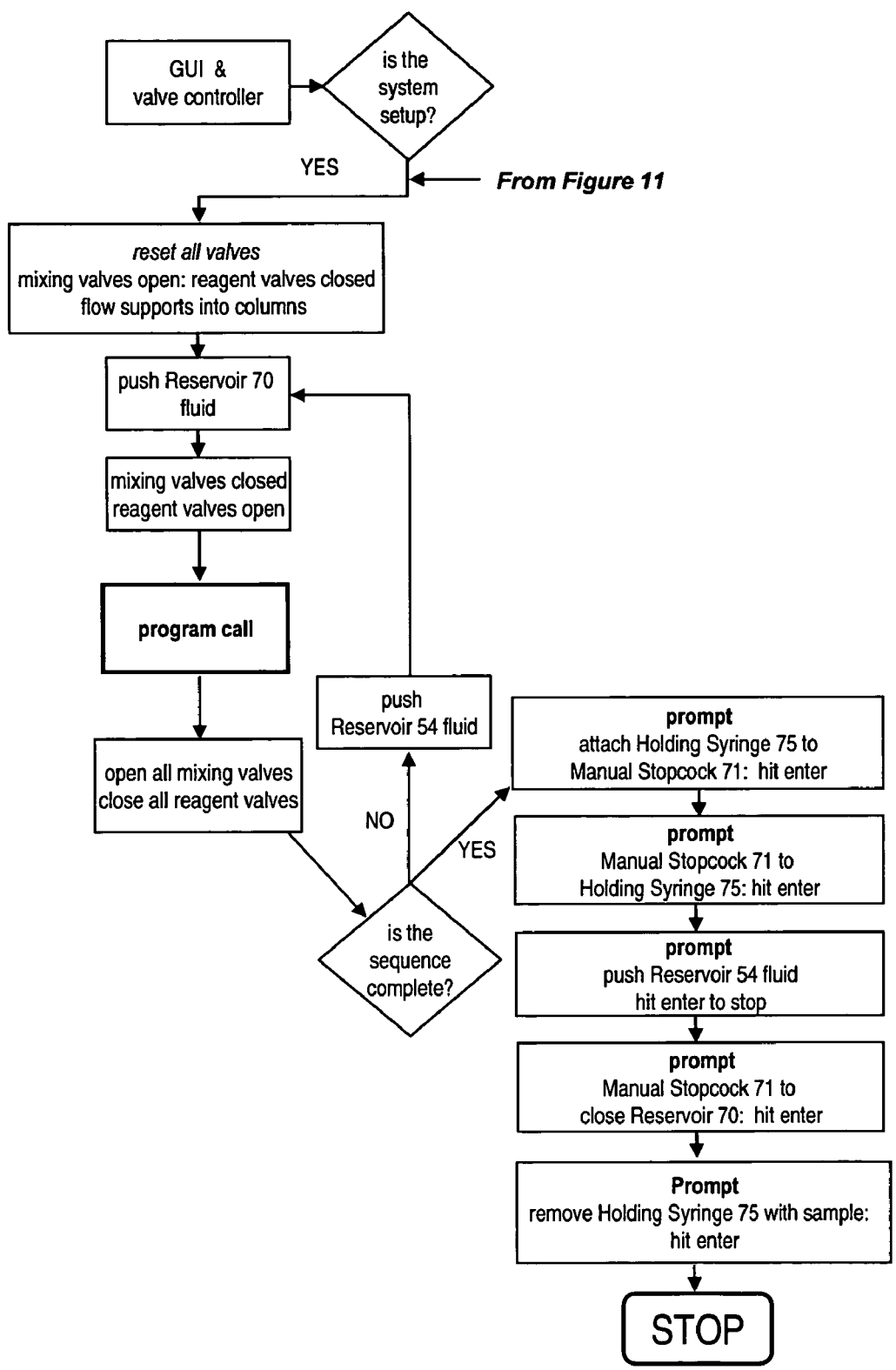

FIG. 12 is a process flow chart for random oligomer synthesis using an oligomer synthesizer according to one embodiment of the present invention.

Figure 13:
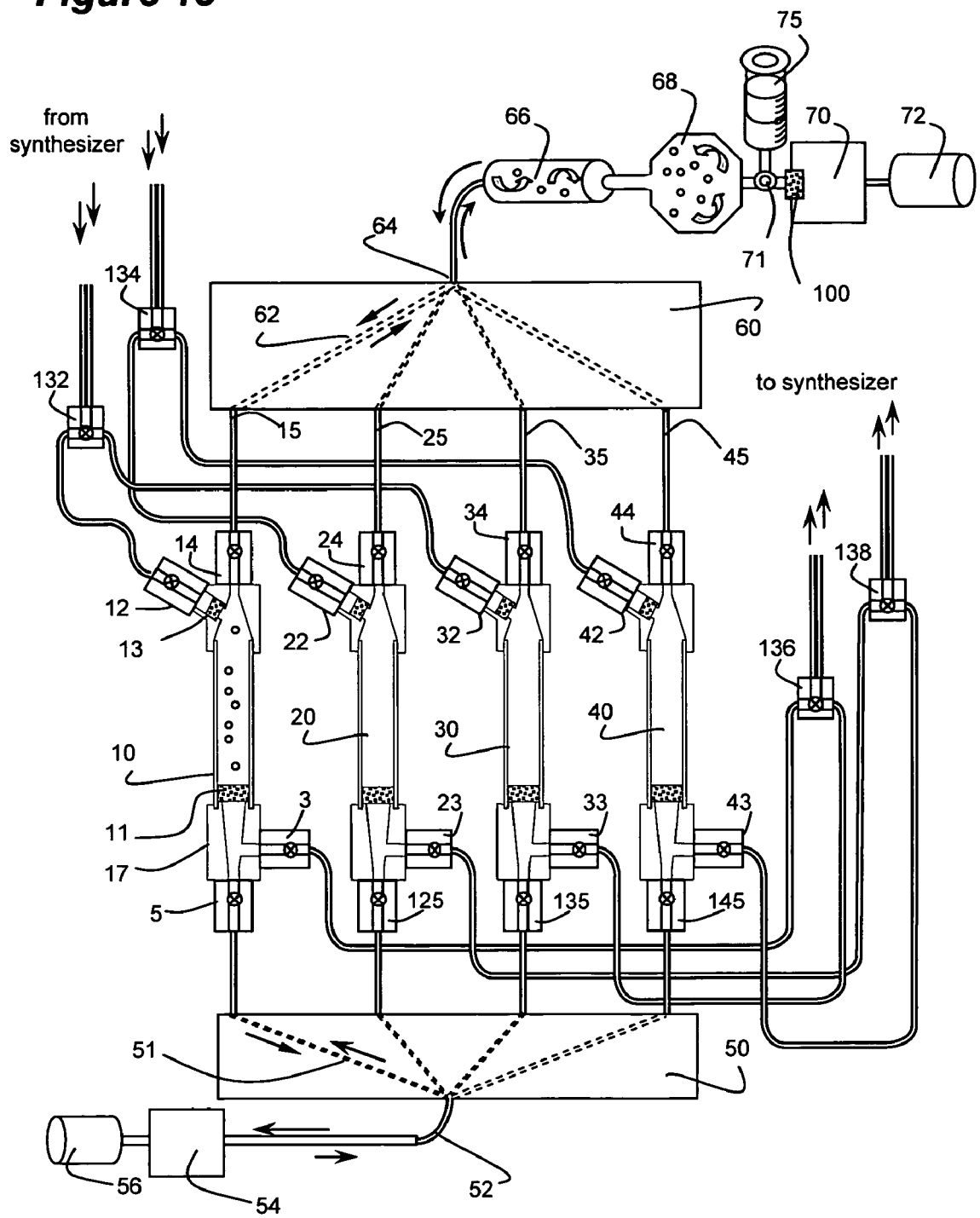

FIG. 13 depicts a diagram of a synthesizer adapted for use with a two column automated synthesizer according to one embodiment of the present invention.

Figure 14:
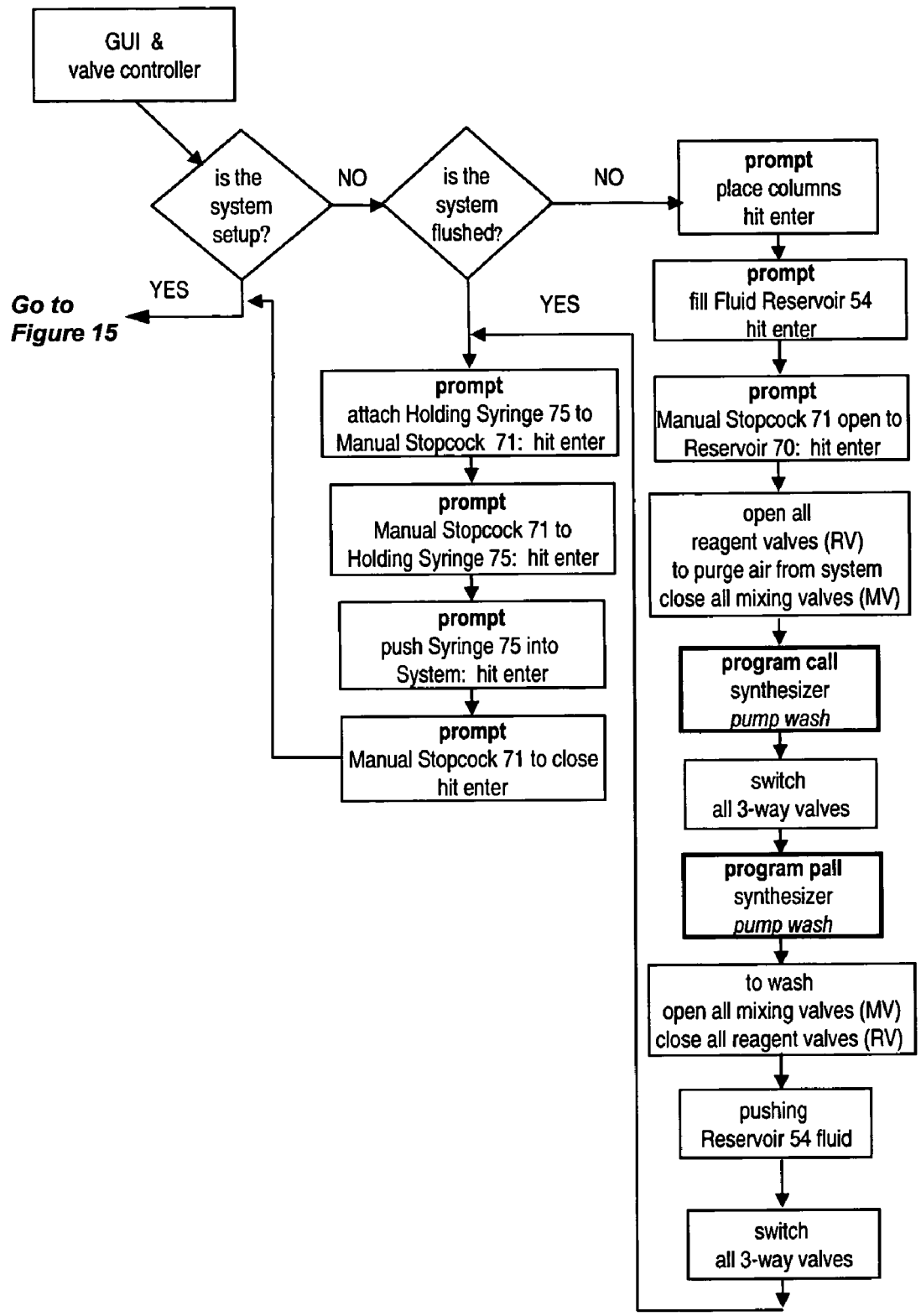

FIG. 14 is a process flow chart for setting up an automated oligomer synthesizer according to one embodiment of the present invention.

Figure 15:
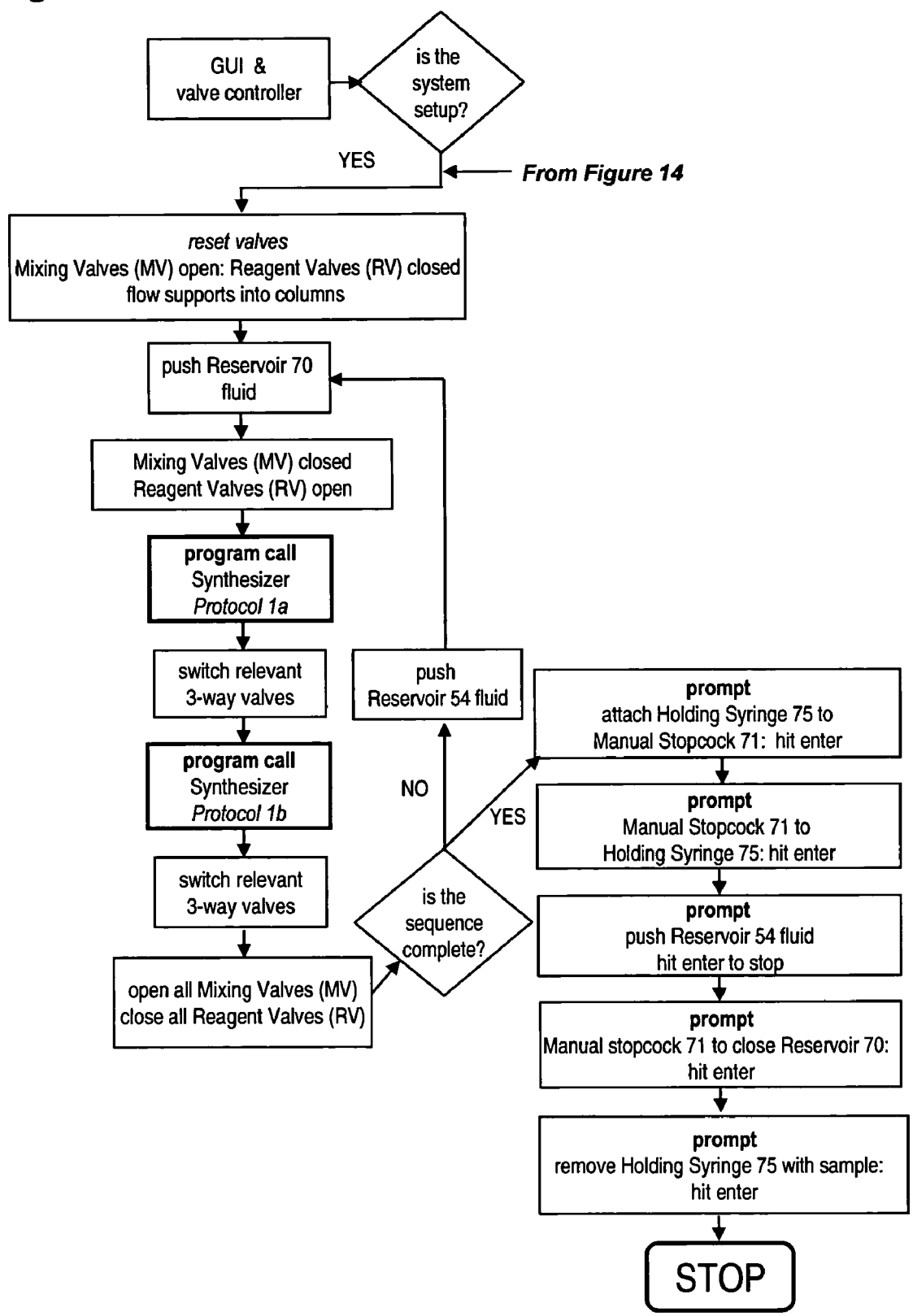

FIG. 15 is a process flow chart for random oligomer synthesis using an automated oligomer synthesizer according to one embodiment of the present invention.

Figure 16:
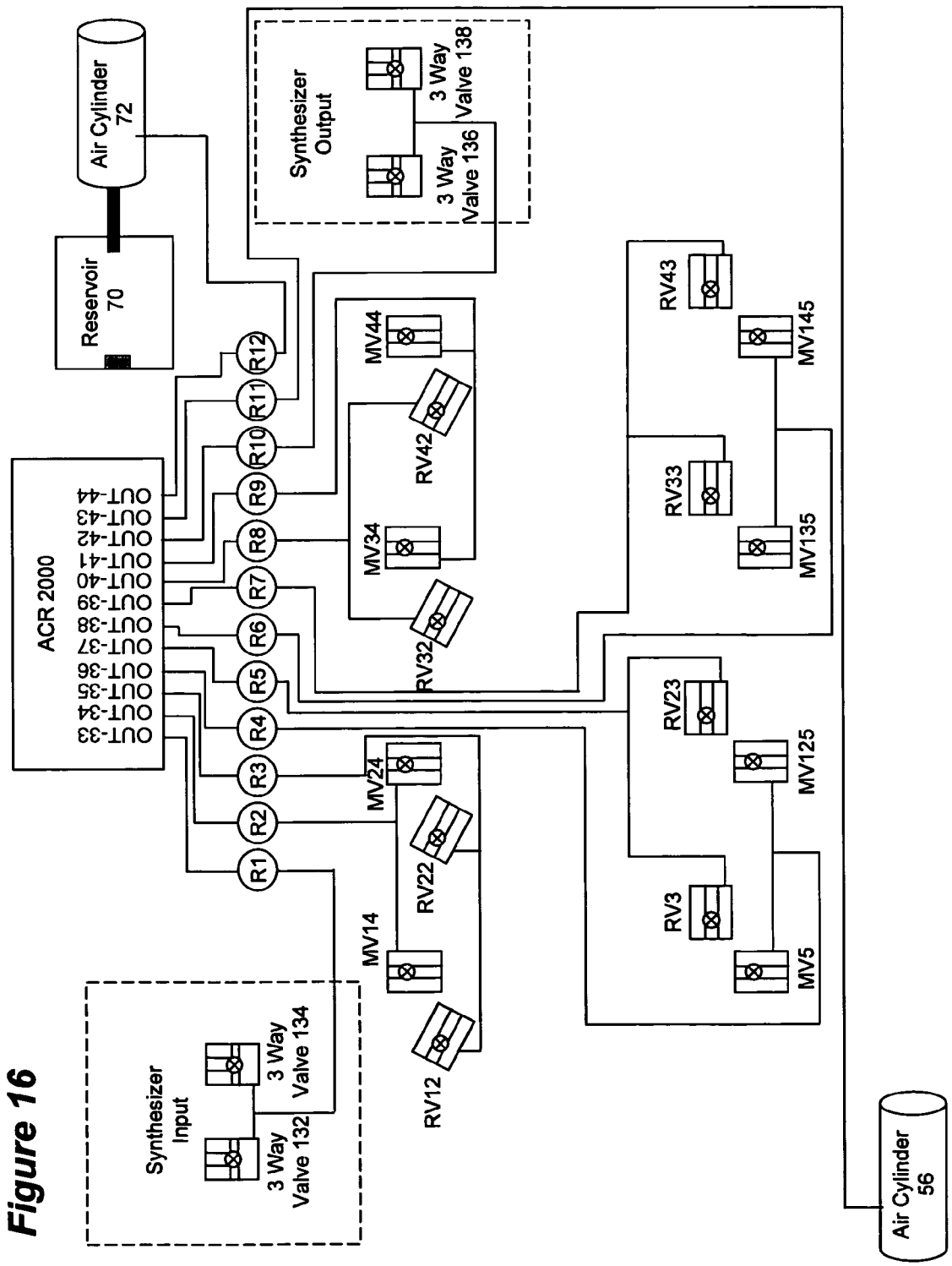

FIG. 16 is one embodiment of an electronic control schematic suitable for use with the automated synthesizer of FIG. 13.

DETAILED DESCRIPTION OF THE INVENTION

While the making and using of various embodiments of the present invention are discussed in detail below, it should be appreciated that the present invention provides many applicable inventive concepts which can be employed in a wide variety of specific contexts. The specific embodiments discussed herein are merely illustrative of specific ways to make and use the invention and do not delimit the scope of the invention.

To facilitate the understanding of this invention, certain terms are defined below. Terms defined herein have meanings as commonly understood by a person of ordinary skill in the relevant arts. The terminology herein is used to describe specific embodiments of the invention, but their usage does not delimit the invention, except as outlined in the claims.

Combinatorial chemistry involves linking together, in an essentially step-wise fashion, identical or non-identical building blocks such as monomeric subunits, chemical groups, and the like, to form libraries of new compounds. The term "library" as used herein refers to a collection of different individual molecules that have a common generic structure and are produced by combinatorial chemistry. Preferably, the library is designed to contain significant if not nearly equal representation of all possible different individual molecules that can be theoretically generated given the chemistry and added constituents, and, as used herein, the phrase "representational library" refers to such libraries. The present invention is applicable to the generation of representational libraries of compounds in various chemical classes including for example nucleic acids, peptides, oligosaccharides, and small organic molecules, such as for example pharmacophores such as benzodiazepines and hydantoins, etc.

The term library in the context of the present invention also refers to the products of split combinatorial synthesis of organic molecules having a common core structure or template which has a discrete number of independently variable substituents, each of which can have one of a defined range of values. Such templates may have a number of different functional sites, including those where each site is amenable to a different coupling chemistry and where a plurality of different substituents are introduced for binding to a different site at succeeding coupling steps. Preferably products having significant if not nearly equal representation of each of these substituents will be present in the library. For a template containing three independently variable functional sites, X, Y and Z, and if X can be one of (m) different chemical moieties, Y can be one of (n) different chemical moieties and Z can be one of (p) different chemical moieties, then m, n and p are integers that define the size of the library, which would contain m×n×p different chemical compounds and all possible combinations of X, Y and Z would be present on the template within the library. See e.g U.S. Pat. No. 6,004,823 where a library of compounds based on N-(4-alkoxyphenyl)-N-acyl-benzylamine, N-(4-alkoxyphenylmethyl)-N-acyl-benzylamine and N-[2-(4-alkoxyphenyl)ethyl]-N-acyl-benzylamine templates is disclosed in which the core compound is first split into three aliquots and reacted with 3 different phenol-amine compounds, pooled and split into 20 aliquots for reacting with 20 different carboxylic compounds, and finally pooled and split into 20 aliquots for reacting with 20 different alcohols. The predicted size of the library is 1200 different compounds.

Where the same group of monomers (for example 4 different monomers) is added at each step, the calculation of numbers of different compounds is Xn, where X is the number of different monomers and n is the length of the polymer. The present invention provides for representational libraries of such compounds through efficient mixing and redistribution as well as automated apparatus for such synthesis.

The library of compounds may be disposed on particulate supports in which each separate support bears a single structural species of the synthetic compound. Each support in the library can contain one to many copies of the single structural species. If still bound to the support, the library may be referred to as a single bead library and the constituent species may be tested while bound to the supports. Alternatively, the structural species can be removed from the particulate supports for further screening.

As used herein, the term "oligomer" refers to a covalently associated chain consisting of 2 or more monomers. A library of oligomers as used herein refers to a collection of oligomeric molecules each having constituent building blocks or monomers assembled in a different unique order (structural species).

Aptamers constitute one class of oligonucleotide molecules derived from combinatorial chemistry. Aptamers are oligonucleotides (double or single stranded DNA or RNA molecules) that fold into sequence dependant three dimensional structures and are biologically active on the basis of resulting structure based interactions (such as decoys) or catalytic properties (such as antisense, ribozymes or siRNA). Identifying useful aptamers, or oligonucleotides having biologic activity on the basis of tertiary structure, requires the generation of very large candidate libraries of random sequence or backbone modification oligonucleotides as well as selection and amplification of the rare structures that are able to interact with a given template. Identification of aptamer structures in libraries of oligonucleotides having regions of defined sequence as well as randomized sequence and backbone modifications such as thioaptamers can be performed by in vitro selection and amplification by the polymerase chain reaction (PCR). As originally described, selection begins with a library of soluble oligonucleotides that is contacted with target compounds followed by partitioning of those nucleic acids having an increased affinity to the target from the candidate mixture. The partitioned nucleic acids are amplified by PCR and, in an iterative series of selection and amplification steps, enrichment and isolation of specific high affinity aptamers is obtained. See, e.g Gold and Tuerk, U.S. Pat. No. 5,270,163, describing an in vitro combinatorial method for the identification of nucleic acid ligands.

Candidate libraries of random sequence oligonucleotides can be generated manually or by modifying the normal operation of sequence specific nucleic acid synthesizers. However, commercial nucleic acid synthesizers are specifically designed to produce defined sequence oligonucleotides by the sequential programmed stepwise addition and coupling of single selected nucleotide bases. In order to generate random nucleic acid oligomers such as aptamers, commercially available nucleic acid synthesizers have been adapted to perform "mixed" synthesis. This essentially constitutes "one-pot" synthesis in which a mixture of nucleotide bases is added in lieu of a single defined base at each coupling step. Using mixed one-pot synthesis, each bead contains a number of different oligonucleotide species which are later cleaved from the support.

Split synthesis as originally adapted to generation of single bead peptide libraries has been recently applied to generate one-bead one-oligonucleotide libraries where each bead presents many copies of a single oligonucleotide sequence or species. (Yang X, Bassett S E, Li X, Luxon B A, Herzog N K, Shope R E, Aronson J, Prow T W, Leary J F, Kirby R, Ellington A D, Gorenstein D G. Construction and selection of bead bound combinatorial oligonucleoside phosphorothioate and phosphorodithioate aptamer libraries designed for rapid PCR-based sequencing. *Nucleic Acids Research* 30, e123 (2002) 8 pages; Yang X, Li X, Prow T W, Reece L M, Bassett S E, Luxon B A, Herzog N K, Aronson J, Shope R E, Leary J F, and Gorenstein D G. Immunofluorescence assay and flow-cytometry selection of bead-bound aptamers. *Nucleic Acids Research* 31(10)(2003) e54. Gorenstein D G, Luxon B, Herzog N and Yang X B, "Bead Bound Combinatorial Oligonucleoside Phosphorothioate and Phosphorodithioate Aptamer Libraries" (U.S. Ser. No. 10/272,509, filed Oct. 26, 2002; WO05/003291A2).

By incubating targets with the bead library, positive beads can be identified by staining and imaging. Although oligonucleotides are relatively chemically stable, they are particularly susceptible to enzymatic degradation by nucleases. Controlled inclusion of modified residues such as thiophosphate (S-ODN) and dithiophosphate ($S_2$-ODN) residues is able to confer nuclease resistance and improve the binding properties of aptamers. See Gorenstein et al., U.S. Pat. No. 6,423,493. Currently it is not possible to produce $S_2$-ODN thioaptamers by the iterative in vitro solution-based combinatorial selection method because no polymerases are able to introduce the dithioate linkage during the required amplification step. Thus a split synthesis method is required for these thioaptamers since a template containing dithioate linkages is able to serve as a template for polymerases (such as Taq polymerase) required to amplify the sequences on the single bead, allowing for identification of the thioaptamer on a single bead.

Application of split synthesis to the production of S-ODN and $S_2$-ODN modified one-bead random thioaptamer libraries is important, if not critical, to the co-selection of both nucleotide sequence and site of backbone modification. Yang et al. *Nucleic Acids Research* 30 (2002) e132. However, available DNA synthesizers are not designed for split synthesis. Thus, the products from each round of synthesis must be manually pooled and split for subsequent rounds of synthesis. Such manual pooling is cumbersome, limits the applicability of the technique, and, where the products of each step are not adequately mixed, may result in unequal representation of all possible different individual molecules that can be theoretically generated given the chemistry and added constituents.

Figure 2:
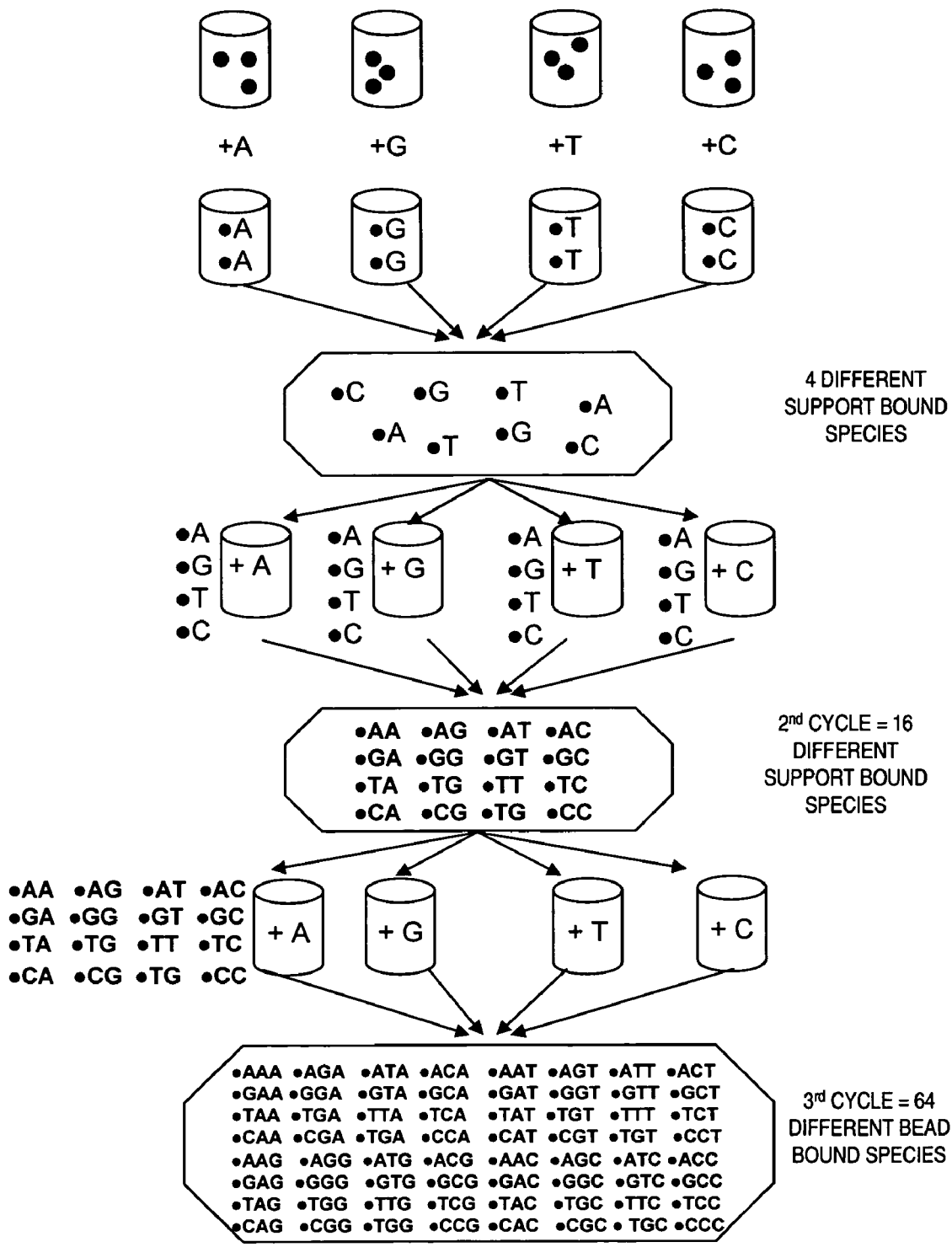
FIG. 2 represents an example of the diversity of products arising by three addition steps in an oligonucleotide synthesis using split synthesis.

The number of different individual molecules conceivably present in a combinatorial oligonucleotide library is calculated by the number of different potential nucleotides for each position in the oligonucleotide sequence. Thus, if any one of 4 different nucleotide bases A, T, G, and C could be present at each of five successive positions in the oligonucleotide chain, the number of possible different sequences of 5 bases in length is $4^5$ or 1024. In an analogous sequence of 24 bases, the possible different sequences is $4^{24}$ or approximately $2.8 \times 10^{14}$. FIG. 2 depicts an example of the variety of sequences produced by 3 cycles using 4 different nucleotides.

Figure 1:
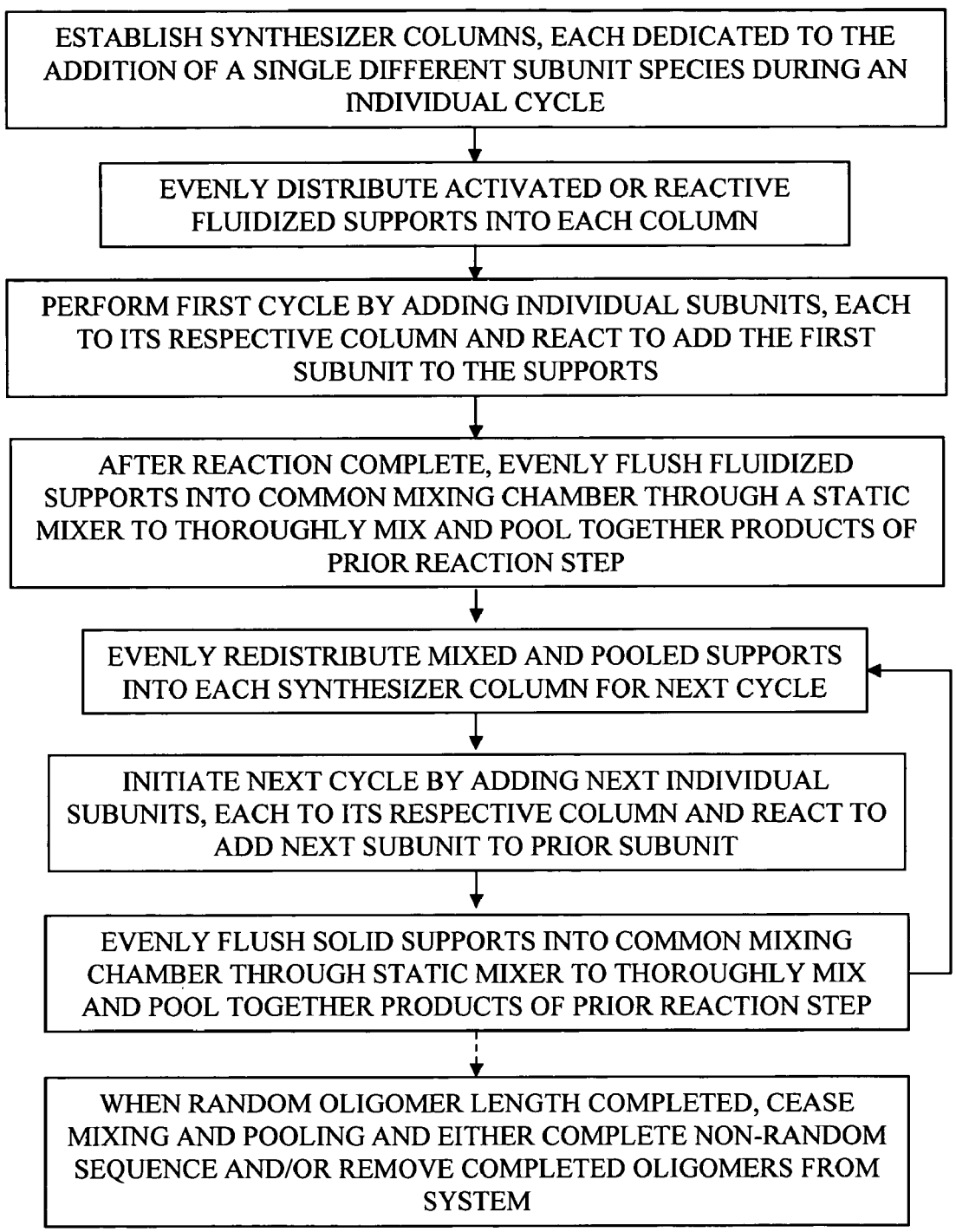
FIG. 1 illustrates a flow chart of oligomer synthesis according to one embodiment of the present invention.

The present invention provides a significant improvement to the generation of representational combinatorial libraries by automated synthesis. Referring to FIG. 1, in one embodiment of the invention, a process for oligomer synthesis includes the following series of steps:

1) Establish synthesizer chambers or columns in the synthesizer, each one optionally dedicated to the addition of a single different subunit species at each cycle;
2) activated or reactive fluidized supports are evenly distributed into each column or chamber;
3) a first cycle reaction is initiated by establishing appropriate reaction conditions through addition, if needed, of successive chemical reagents, followed by addition of individual subunits, each to its respective synthesizer chamber, and allowing covalent addition of the added subunit to the supports according to the appropriate chemistry, or alternatively, by adding a second subunit in the case where the supports are supplied with a first subunit or oligomeric chain already attached;
4) treat the support with newly added subunit in accordance with appropriate chemistry as required, including if required, washing to remove excess reagents, then evenly flush supports into common mixing chamber through static mixer to thoroughly mix and pool together the products of the first random subunit reaction cycle;
5) evenly redistribute the pooled supports into each synthesizer chamber such that each synthesizer chamber receives an equal distribution of pooled supports;
6) initiate a next cycle by establishing the appropriate reaction conditions through the addition, if needed, of successive chemical reagents, followed by adding the individual subunits, each to its respective synthesizer chamber, and allowing covalent addition of the added subunit to the solid support according to the appropriate chemistry;
7) repeat cycle until random oligomers of desired length are obtained.

Alternatively, the oligomeric chain may have sections that are non-random. For example, in a typical aptamer, at least the 5' and 3' terminus constitute preselected sequences of PCR primers and may be generated by first nonrandom programmed stepwise addition to supports in one or more of the synthesis chambers. In addition a mixture of appropriate subunits could be added at each step so as to produce a library of random libraries.

FIG. 2 depicts an example for oligonucleotide synthesis wherein the variety of sequences produced by only 3 cycles using 4 different nucleotides is presented in accordance with the present invention where the numbers of solid supports modified and thus the resultant random sequence population is representational at each position. In accordance with FIG. 2, each different species is added at each cycle in its own synthesizer column. The representational populations of FIG. 2 are obtainable because the present method and apparatus provides complete mixing of the fluidized solid supports during each pooling step followed by even distribution of the pool into each synthesizer column. Thus, as in the example of FIG. 2, an equal number of solid supports evenly representing the pooled population will be distributed into each of 4 different synthesizer columns for addition of the next subunit. So, for example at cycle 1, 25% of the supports will bear an A at position 1, 25% will bear a G at position 1, 25% will bear a T at position 1, and 25% of the supports will bear a C at position 1. After complete mixing and pooling, the supports are redistributed to provide an equal number of beads into each column for the next cycle in which 25% of the population will have an A added at position 2, 25% will have a G added at position 2 and so on. The result is that each position in the growing oligomer chains has an even distribution of subunit species at that position. In accordance with the present invention, differences in reaction conditions and time of reaction can be accommodated such that the relative percentage population at each cycle remains representational.

In contrast, for example, in the absence of complete mixing and redistribution, each subunit position can have an unequal distribution of representative species. Thus, only 10% of the population might have an A at position 2, while 40% might have a G at position 2. The effect of disproportionate addition can be amplified at each cycle, resulting in profoundly skewed subunit representation at one or more positions.

Referring to FIG. 3, an embodiment of the invention is depicted. Individual synthesizer chambers, in this example columns 10, 20, 30 and 40 are provided, one for each different type of subunit species to be included in the oligomer. Thus, for example, for an oligodeoxynucleotide oligomer having the subunit or monomer species of deoxyadenosine (dA), deoxythymidine (T), deoxyquanosine (dG), and deoxycytidine (dC), four synthesizer columns can be used, one for each monomer species. If, for example further subunit species, such as phosphorothioate oligonucleotides (S-ODNs) and/or phosphorodithioate oligonucleotides ($S_2$-ODNs) or other base and backbone modifications are desired, these subunits can be added into one or more of the columns at a particular step or can be provided in further additional columns.

In the depicted embodiment, taking a synthesizer chamber or column assembly 110 for reference (each of the plurality of chambers having similar basic components), the lower end of chamber 10 includes fritted lower aperture 11, wherein the porosity of the frit retains the fluidized solid supports in chamber 10 during reaction steps while permitting pressurized passage of reactants, reagents and flushing solutions in and out of the chamber through the fritted aperture. Alternatively, in lieu of a singe bottom support frit, frits can be provided prior to the mixing valve 5 and the outlet reagent valve 3. The lower frit 11 is in fluid communication with an output assembly 17 including, in this embodiment, a mixing valve 5 and an outlet reagent valve 3. Although the diagram depicts the columns in a vertical position having valves on upper and lower ends, it is understood that the assembly can be driven by pressure driven fluids and could be in a number of orientations including a horizontal orientation. In the depicted embodiment, mixing valve 5 is in fluid communication with conduit 51 for fluid communication, such as via conduit 52, with a reagent reservoir 54. Pressure actuation for moving fluid into and out of reservoir 54 is provided by a motive force such as a pump, air cylinder or syringe pump 56. In an alternative embodiment, fluid entering or leaving the chambers 10-40 is conveyed through a splitter box 50 prior to entering the reservoir 54 through conduit 52. In one preferred embodiment, the individual fluid paths between each chamber 10-40 and reservoir 54 are essentially equivalent, so that the same volume and pressure is deliverable to each column. As depicted in FIG. 4, outlet reagent valve 3 together with inlet reagent 12 together control a reagent fluid path for entry or exit of reactants or wash solutions, or alternatively, for harvesting of oligomers cleaved from fluidized solid supports at the completion of synthesis.

The upper portions of each chamber 10-40 include a fritted upper reagent inlet aperture 13 for the entry of reactants into the synthesis chambers. Entry into the fritted upper reagent inlet aperture 13 is controlled through input reagent valve 12. The top portion of each chamber 10 includes a valve controlled top column valve 14. A fluid communication is provided between each top column valve 14 and static mixer 66 through fluid conduits leading from each column such as conduits 15, 25, 35 and 45. In a preferred embodiment, the individual fluid conduits 15, 25, 35 and 45 between each column 10-40 and static mixer 66 are essentially equivalent relative to the volume and pressure that is deliverable to and from each chamber such that each chamber can be provided with essentially the same number of fluidized supports during redistribution of the supports after each pooling step.

In the depicted embodiment, conduits 15, 25, 35 and 45 are provided by tubing that leads from each column or chamber 10-40 to a plurality of fluid paths 62 disposed in splitter box 60 and leading to a single outlet 64 and further conveyed through static mixer 66 and on to mixing chamber 68. As used herein, the term "splitter box" refers to a common fluid connection or port for combining fluid conveyed by multiple inputs.

The splitter box is disposed in fluid communication and in-line between the valve controlled mixing outlets 14 of each chamber and static mixer 66, which is in turn in-line and in fluid communication with mixing chamber 68. Mixing chamber 68 is in fluid communication with a reagent reservoir 70 through valvable conduit 71. Pressure actuation for moving fluid into and out of reservoir 70 is provided by a motive force such as a pump, air cylinder or syringe pump 72.

One embodiment of the mixing assembly aspect of the synthesizer is depicted in FIG. 5, with individual aspects depicted in more detail in FIGS. 6-10. Referring to FIG. 8, in one embodiment, the splitter box is a block having equally dimensioned channels 62, one for each synthesizer chamber, and leading to common conduit or outlet 64. A variety of splitter box configurations can be generated, each having a number of inlet channels 62 that corresponds to the number of synthesizer chambers desired.

Referring to FIG. 6, an embodiment of static mixer 66 is provided. As used herein, the term "static mixing" means mixing by flowing through a conduit, channel, or pipe that has fixed internal elements. The internal elements create turbulent flow in fluids passing through the conduit. Examples of static mixers include cylindrical conduits having a pattern of protrusions into the interior of the conduit, such as for example a series of one or more bars 67 placed across the conduit, perpendicular to the flow path and in pattern provided by placing successive bars differing longitudinal angles relative to the prior bar. Other static mixers that may be employed have internal helical elements such as a series of left and right twisting helical elements, typically placed at an angle of 90° to each other.

In one embodiment, the static mixer 66 comprises a conduit having a plurality of fixed bars 67 extending across the conduit and perpendicular to a fluid path. In an alternative embodiment as depicted in FIG. 7, static mixer 66 comprises a conduit having one or more fixed helical elements 65 within the conduit. The fixed elements induce turbulence in fluids flowing along the fluid path, thereby thoroughly and evenly mixing any constituents such as the fluidized supports leaving each synthesizer chamber for pooling in mixing chamber 68. As used herein, the term "even mixing" refers to combining individual elements such that they cannot be easily distinguished or separated and such that a given volume will contain an evenly distributed representation of each member of the population.

Referring to FIG. 9, mixing chamber 68 is configured to limit trapping of the fluidized supports. Thus as depicted in FIGS. 9 and 10, trapping can be avoided by the elimination of sharp angles such as relative adjoining wall angles of less than 90° in the interior 69 of the chamber. Alternatively, mixing chamber 68 can have rounded interior surfaces such as with an oval or spherical configuration. Reagent reservoir 70 is in fluid communication with mixing chamber 68 through valve 71.

As depicted in FIG. 3, valve 71 and frit 100 prevent fluidized supports from entering the top reagent reservoir. In one depicted embodiment of FIGS. 3 and 4, solid reaction supports such as derivatized beads are added to the system through valve 71 through syringe 75. Many types and suppliers of suitable syringes are known in the art. For example, syringes such as SGE Jumbo syringes (ALLTECH Associates, Deerfield, Ill.) can be employed. Where the system is used to generate single bead oligomer libraries, the completed beads can be removed from the system through valve 71 as well. In one embodiment of the present invention, valve 71 is a manually operated three-way valve. Many types and suppliers of suitable three way manual valves are known in the art. For example, three way stopcock valves such as SELEC-3+SC (stopcock) available from ALLIANCE MEDICAL (ALLMED, Independence, Mo.) can be employed.

Pressure actuation for moving fluid into and out of the reservoir is provided by a motive force such as a pump, air cylinder or syringe pump 56 and 72 as depicted in FIG. 3. For example, suitable air cylinders include the F-Series Air Cylinders supplied by FABCO-AIR (Gainesville, Fla. 32609). As depicted in FIG. 4, the concerted action of the various valves, such as for example mixing valves 14 and 5 placed essentially at opposite ends of the column, together with pressure provided to either reservoir 70 or 54 create the mixing fluid path drives the direction of mixing fluid flow through the synthesis assembly 110. The pressure flow driven conveyance of the fluidized solid supports through the static mixer 66 provide thorough mixing by turbulent flow while avoiding shearing or damage to the supports.

As shown in the embodiment of FIG. 4, a reagent fluid path through the column is controlled by the concerted action of reagent inlet valve 12 and reagent outlet valve 3, together with pressure provided by external reservoirs and pumps. For example, reagent reservoirs, pumps and programming interface supplying the reaction assembly of the present invention can be provided by a standard synthesizer that is designed to provide single or multiple column synthesis of oligomers of defined sequence.

In one embodiment of the present invention, the synthesis system is automated and is run by a programmable controller. The controller can have a graphical user interface (GUI). Two and three-way electromechanical valves are utilized. Many types and suppliers of suitable electromechanical valves are known in the art. For example, two and three-way solenoid valves supplied by the PNEUTRONICS Division of Parker Hannifin (Fairfield, N.J.) can be suitably employed. The valves can be operated by many types of suitable controllers known in the art. For example, ACR 2000 Controllers supplied by Parker Automation (Parker Hannifin, Rohnert Park, Calif.) have been suitably employed.

FIG. 11 depicts a sequence that can be run manually or can be automated for prepping a synthesizer in accordance with one embodiment of the invention. In an automated embodiment, the graphic user interface (GUI) queries whether the system is set up. If the answer is "no", a further query as to whether the system is flushed is generated. If the answer is "no", a flushing sequence is initiated, such as for example the sequence of FIG. 11. A desired number of columns or synthesizers is set up in the system and fluid reservoirs are filled such as fluid reservoir 54 of FIG. 3. Through a series of automated flushing steps and synchronous valve movement, all air is removed from the system, finally resulting in a signal that the system is fully flushed. In one embodiment, a holding syringe is then used to add the fluidized supports to the system, such as through a manual stopcock 71 of FIG. 3. FIG. 12 depicts one sequence of events for conducting synthesis after the set up depicted in FIG. 11. As shown in FIG. 12, mixing valves are open when reagent valves are closed and visa versa depending on whether a reagent fluid path is engaged during a synthesis step or whether a mixing fluid path is engaged during a mixing and redistribution step.

In one embodiment of the invention, the reaction assembly for synthesis of oligomers of random sequence subunits on fluidized solid supports is a stand alone synthesizer including pumps and bulk reactant containers. Alternatively the reaction assembly can be an accessory or add-on equipment module to an existing synthesizer for the purpose of adapting the synthesizer to perform split combinatorial synthesis.

For example, and in reference to FIG. 13, a standard two column DNA synthesizer for individual column synthesis of oligonucleotides of defined sequence, such as, for example, the Applied Biosystems ABI 8908, can be adapted to essentially provide the reagent reservoirs, pumps and programming interface supplying the reaction assembly of the present invention which substitutes essentially for the reaction columns of the existing synthesizer. The programming and fluid conduit arrangement depends on the characteristics of the commercial synthesizer.

For example, with a two column synthesizer as the reagent input, the two input conduits can be optionally attached to four (or more) columns through valves such as automated three way input valves 132 and 134 as shown in FIG. 13. In the embodiment depicted in FIG. 13, three way input valve 132 supplies reactants from the commercial synthesizer to columns 10 and 30 through input or inlet reagent valve 12 (reagent valves are shown as RV_in a corresponding electronic schematic depicted in FIG. 16. Thus, inlet reagent valve 12 in FIG. 13 corresponds to RV12 in FIG. 16 and input reagent valve 32 to RV32. Three way input valve 134 supplies reactants to columns 20 and 40 through input reagent valve 22 (in corresponding FIG. 16=RV22) and input reagent valve 42 (in corresponding FIG. 16=RV42).

Also in reference to FIG. 13, and in the example of attachment to a two column synthesizer, the four outlet conduits return to the synthesizer through automated valves such as three way outlet valves 136 and 138. In the embodiment depicted in FIG. 13, three way outlet valve 136 returns solutions to the commercial synthesizer from columns 10 and 30 through outlet reagent valve 3 (RV3) and outlet reagent valve 33 (RV33). Three way outlet valve 138 returns solutions from columns 20 and 40 through outlet reagent valve 23 (RV23) and outlet reagent valve 43 (RV43).

Using this example of a two column synthesizer such as, for example, the Applied Biosystems ABI 8908, to essentially provide the reagent reservoirs, pumps and programming interface supplying the reaction assembly of the present invention, all four columns are first loaded with the solid reaction supports such as derivatized beads from syringe 75 attached at valve 71 and through to each column 10, 20, 30 and 40 via conduits 15, 25, 35 and 45 and the respective automated top two-way mixing valves 14, 24, 34, and 44.

After washing and prepping the system, the top mixing valves 14, 24, 34, and 44 and the bottom mixing valves 5, 125, 135, and 145 are closed and the ABI synthesizer is first asked to emulate a synthesizer run #1a by delivering different reactants through automated three-way valves 132 and 134 and further through automated two-way inlet reagent valves 12 and 22 respectively to columns 10 and 20. Frit 13 positioned in each of inlet valves 12, 22, 32 and 42, can prevent loss of the solid supports through the inlet valves, just as bottom frit 11 in each column prevents loss of supports through either the bottom mixing valves 5, 125, 135, and 145 or the outlet reagent valves 3, 23, 33, and 43. Next, the ABI synthesizer is asked to emulate a synthesizer run #1b by delivering two further different reactants to columns 30 and 40 also through automated three-way inlet valves 132 and 134 and further through automated two-way inlet reagent valves 32 and 42. The system can be adapted to control the reaction times and conditions on the columns either in sets or individually prior to mixing at the end of each monomer addition.

Removal of reactants, and/or addition and removal of further chemical reactants is accomplished through coordinated flow through open inlet reagent valves 12, 22, 32 and 42 and open outlet reagent valves 3, 23, 33, and 43. At the completion of each reaction, and with inlet and outlet reagent valves closed, automated top mixing valves 14, 24, 34, and 44, as well as bottom mixing valves 5, 125, 135, and 145, are opened and a motive force is applied to flush the supports up out of the columns and ultimately through static mixer 66 into mixing chamber 68. In one embodiment, the motive force is provided by such as by air pressure from air cylinder 56 which drives fluid from reservoir 54 up into each column. After mixing, the solid phase supports are evenly redistributed to the columns for the next monomer addition step.

For one embodiment where the reaction assembly of the present invention is set up to run four columns and relies on a two column commercial synthesizer such as, for example, the Applied Biosystems ABI 8908, to essentially provide the reagent reservoirs, pumps and programming interface for supplying the reaction assembly, one possible relationship between reaction columns as depicted in the example of FIG. 13 and the columns and run cycles of a commercial two column synthesizer is shown below with one example of a corresponding process schematic depicted in FIGS. 14 and 15. FIG. 16 presents one example of a wiring schematic that can be used to operate the automated synthesizer of FIG. 13.

| Column | Commercial Synthesizer column | Commercial Synthesizer Run |
|---|---|---|
| 10 | 1 | 1 |
| 20 | 2 | 1 |
| 30 | 1 | 2 |
| 40 | 2 | 2 |

In one working embodiment, Series 1 diaphragm type 3-way solenoid valves from the PNEUTRONICS Division of Parker Instrumentation were found to be suitable although many types of controllable three way valves, and manufacturers thereof, are known to those of skill in the art and may be equally suitable. When used in conjunction with a commercial automated synthesizer, a relay circuit such as that depicted in FIG. 16 has been used to run the automated sequence depicted in FIGS. 14 and 15 using the synthesizer depicted in FIG. 13. As previously discussed, the Input and Output Reagent Valves of FIG. 13 are designed for convenience in the exemplified wiring schematic of FIG. 16 as "RV_". The mixing valves of FIG. 13, such as automated top mixing valves 14, 24, 34, and 44, as well as bottom mixing valves 5, 125, 135, and 145, are depicted on FIG. 16 as "MV_". Thus, for example, input reagent valve 12 in FIG. 13 corresponds to RV12 in FIG. 16 just as input reagent valve 32 corresponds to RV32 and so forth. Mixing valve 14 of FIG. 13 corresponds to MV14 of FIG. 16 and so forth.

For purposes of the present invention, the phrase "solid support" means an insoluble material to which compounds can be attached during a synthesis sequence and that can be transported entrained in a fluidized or phase support stream.

Suitable solid support materials include, but are not limited to inorganic or organic materials including controlled pore glass (CPG), glass, silica or silica containing materials, carbon, metals, polymers, plastics, and resins including polystyrene, polyacryloylmorpholide, polystrene/latex, polyacrylate, polyacrylamide, agar, agarose, chemically modified agars and agarose, carboxyl modified teflon, nylon, nitrocellulose, polysaccharides, and the like. The surfaces of the solid substrate may be composed of the same or different material as the interior of the support.

The surface of the solid supports can be or is chemically modified, functionalized or derivatized to present reactive groups, such as, for example, amino, carboxyl, hydroxyl, thiol groups etc., including linkers, for the attachment of nucleic acids, proteins, carbohydrate, small organic molecules, etc. Other suitable solid support materials and the derivatization thereof are well known to those of skill in the art.

The term "bead" means any solid support that is generally spherical in overall dimension. Such beads may include, without limitation, beads that are oval, globular, fenestrated, etc.

In one embodiment of the present invention, methods and apparatus are provided for the generation of random oligonucleotide polymers. In the most typical oligonucleotide synthesis, synthesis is done on solid supports, often a Controlled Pore Glass (CPG) or polystyrene. Often the support is supplied already derivatized with a first nucleotide base that is attached to a spacer arm via an ester linkage at the 3'-hydroxyl. The support is loaded into a small chamber such as a column terminated with a porous frit which serves as the reaction chamber. The support allows reactions to take place in the chamber, while allowing the removal of excess and spent reagents by filtration, thus eliminating the need for purification steps between base additions. The loaded column is attached to reagent delivery lines on the synthesizer and the chemical reactions proceed under computer control. Bases are added to the growing chain in a 3' to 5' direction, which is opposite to enzymatic synthesis by DNA polymerases.

In one phosphoramidite chemistry for oligonucleotide synthesis suitable for use in the present method and apparatus, the synthesis may be initiated by using dichloroacetic acid (DCA) or trichloroacetic acid (TCA) to cleave of the protecting 5'-dimethoxytrityl (DMT) group and thus making available the 5'-hydroxyl. The next activation step involves the simultaneous addition to the reaction of a phosphoramidite derivative of the next nucleotide and tetrazole, a weak acid. The tetrazole protonates the nitrogen of the phosphoramidite thus creating a very reactive intermediate that couples rapidly with the added phosphoramidite. The 5'-OH group of the resulting terminal phosphoramidite is blocked with its DMT group.

A capping step can be used to terminate any unreacted chains that have free 5'-OH groups to become "failure products" by addition of acetic anhydride and 1-methylimidazole. The DMT group of the successfully coupled products protects the 5'-OH end from being capped. The internucleotide linkage is then converted from a less stable phosphite to a phosphotriester by oxidation with iodine in a solution of THF, pyridine and water. After oxidation, the DMT group is removed with trichloroacetic acid and the cycle is repeated until the desired oligonucleotide chain is complete.

In one embodiment, random oligonucleotides are generated that include modified nucleotides such as phosphorothioate oligonucleotides (S-ODNs) or phosphorodithioate oligonucleotides ($S_2$-ODNs) in which sulfurs replacing one or both of the non-bridging phosphate oxygens bind to proteins more tightly than unmodified oligonucleotides and have the potential to be used as diagnostic reagents and therapeutics.

All publications, patents and patent applications cited herein are hereby incorporated by reference as if set forth in their entirety herein. While this invention has been described with reference to illustrative embodiments, this description is not intended to be construed in a limiting sense. Various modifications and combinations of illustrative embodiments, as well as other embodiments of the invention, will be apparent to persons skilled in the art upon reference to the description. It is therefore intended that the appended claims encompass such modifications and enhancements.

We claim:

1. A synthesizer for combinatorial chemistry comprising:
   a plurality of synthesizer columns adapted to retain solid reaction supports within the columns during a series of reaction steps, each synthesizer column comprising a reagent fluid path selectively controlled by individual inlet and outlet reagent valves disposed on opposite ends of each column, and a mixing fluid path selectively controlled by individual first and second mixing valves disposed on opposite ends of each column;
   a common mixing chamber in fluid communication with each of the synthesizer columns when the mixing fluid path is established by flow through the first mixing valves of each synthesizer column, said first mixing valves disposed in-line between each synthesizer column and common mixing chamber;
   a pressure controllable fluid reservoir in fluid communication with the mixing fluid path and adapted to provide a motive force to the mixing fluid path to transport a stream of fluidized solid supports into the synthesizer columns for the series of reaction steps as well as out of the synthesizer columns and into a common mixing chamber between reaction steps.

2. The synthesizer of claim 1, further comprising a programmable interface for controlling a sequence of valve and fluid path movement.

3. The synthesizer of claim 1, further comprising a static mixer disposed in fluid communication and in-line between the first mixing valves of each synthesizer column and the common mixing chamber.

4. The synthesizer of claim 1, further comprising a second pressure controllable reservoir in fluid communication with mixing fluid path, wherein the motive force for the mixing fluid path is provided by a combined action of the pressure controllable fluid reservoirs, which are disposed at essentially opposite ends of the mixing fluid path.

5. The synthesizer of claim 4, wherein the mixing fluid path is configured to provide equal fluid volume and pressure to and from each column and the common mixing chamber.

6. The synthesizer of claim 1, wherein the solid reaction supports are fluidized and are retained in each column during reaction steps by at least one fritted aperture.

7. The synthesizer of claim 1, wherein the reagent valves and the mixing valves are solenoid valves.

8. The synthesizer of claim 1, further comprising at least one splitter box disposed in the mixing fluid path.

9. The synthesizer of claim 1, further comprising a pair of splitter boxes, wherein the splitter boxes are disposed in the mixing fluid path between the columns and both of the pressure controllable fluid reservoirs.

10. The synthesizer of claim 1, wherein the mixing chamber is configured by elimination of sharp interior angles to limit trapping of the fluidized solid supports.

11. The synthesizer of claim 10, wherein the mixing chamber is devoid of recesses and interior angles of less than approximately 90°.

12. The synthesizer of claim 3, wherein the static mixer comprises a conduit intersected by fixed internal elements that create turbulence in a fluid flow conveying the fluidized solid supports through the static mixer.

13. A synthesizer for combinatorial chemistry comprising:
a plurality of synthesizer columns, each column comprising:
   a fritted reagent inlet aperture and a non-fritted mixing aperture disposed on a first end of each column,
   a fritted outlet aperture on a second end of each column,
   a reagent inlet valve in fluid communication with the fritted reagent inlet aperture and a reagent outlet valve in fluid communication with the fritted outlet aperture;
   a first mixing valve in fluid communication with the non-fritted mixing aperture and a second mixing valve in fluid communication with the fritted outlet aperture;
a common mixing chamber in selective fluid communication with each synthesizer column, wherein the first mixing valve of each synthesizer column is disposed between the synthesizer column and the common mixing chamber;
a pressure controllable fluid reservoir in fluid communication with the mixing chamber and adapted to control a fluid flow of fluidized solid supports into the synthesizer columns for the series of reaction steps as well as out of the synthesizer columns and into the common mixing chamber between reaction steps.

14. The synthesizer of claim 13, further comprising a programmable interface for controlling a sequence of valve and fluid flow movements.

15. The synthesizer of claim 13, further comprising a second pressure controllable reservoir in fluid communication each synthesizer column, wherein the fluid flow is controlled by a combined action of the pressure controllable fluid reservoirs.

16. The synthesizer of claim 13, wherein the reagent valves and the mixing valves are solenoid valves.

17. The synthesizer of claim 13, further comprising at least one splitter box.

18. The synthesizer of claim 15, further comprising a pair of splitter boxes, wherein the splitter boxes are disposed between the columns and each of the pressure controllable fluid reservoirs.

* * * * *